United States Patent
Gilliland et al.

(10) Patent No.: US 11,370,537 B2
(45) Date of Patent: *Jun. 28, 2022

(54) INTEGRAL FLEXURED CARRIERS FOR AIRCRAFT PLANETARY GEAR SYSTEMS

(71) Applicant: Textron Innovations Inc., Providence, RI (US)

(72) Inventors: Colton James Gilliland, Northlake, TX (US); Russell Lee Mueller, Coppell, TX (US); Tyson T. Henry, Arlington, TX (US)

(73) Assignee: Textron Innovations Inc., Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/401,210

(22) Filed: Aug. 12, 2021

(65) Prior Publication Data

US 2021/0371098 A1    Dec. 2, 2021

Related U.S. Application Data

(63) Continuation of application No. 16/661,118, filed on Oct. 23, 2019, now Pat. No. 11,111,014.

(51) Int. Cl.
*F16H 1/28* (2006.01)
*B64C 29/00* (2006.01)
(Continued)

(52) U.S. Cl.
CPC .......... *B64C 29/0033* (2013.01); *B64D 35/04* (2013.01); *F16H 1/36* (2013.01);
(Continued)

(58) Field of Classification Search
CPC ....... B64C 29/0033; B64D 35/04; F16H 1/36; F16H 57/02; F16H 57/082;
(Continued)

(56) References Cited

U.S. PATENT DOCUMENTS 4,663,967 A    5/1987    Parkinson
6,117,041 A    9/2000    Avery et al.
(Continued)

FOREIGN PATENT DOCUMENTS

CN    205715578 U  *  11/2016
EP    3064802 A1     9/2016
(Continued)

*Primary Examiner* — Sherry L Estremsky
(74) *Attorney, Agent, or Firm* — Lawrence Youst PLLC

(57) ABSTRACT

A drivetrain for an aircraft includes an engine, a driveshaft receiving rotational energy from the engine and a gearbox including a planetary gear system receiving rotational energy from the driveshaft. The planetary gear system includes a sun gear, planet gears, a ring gear and an integral carrier forming flexured carrier posts. Each flexured carrier post supports a respective one of the planet gears and has a fixed proximal end and a cantilevered distal end. The planetary gear system includes flexured roller races, each having a fixed end and a cantilevered end. The fixed end of each flexured roller race is coupled to the cantilevered distal end of a respective flexured carrier post. The planet gears engage with the flexured roller races to rotate about the flexured carrier posts. The cantilevered ends of the flexured roller races experience cantilevered motion to absorb loads from the planet gears.

20 Claims, 9 Drawing Sheets

(51) Int. Cl.
*F16H 1/36* (2006.01)
*F16H 57/08* (2006.01)
*B64D 35/04* (2006.01)
*F16H 57/02* (2012.01)

(52) U.S. Cl.
CPC ............ *F16H 57/02* (2013.01); *F16H 57/082* (2013.01); *F16H 1/2836* (2013.01); *F16H 2057/02043* (2013.01); *F16H 2057/085* (2013.01)

(58) Field of Classification Search
CPC ..... F16H 2057/02043; F16H 2057/085; F16H 1/2836
See application file for complete search history.

(56) References Cited

U.S. PATENT DOCUMENTS

| | | | |
|---|---|---|---|
| 6,422,970 | B1 | 7/2002 | Paroli |
| 7,056,259 | B2 | 6/2006 | Fox |
| 7,297,086 | B2 | 11/2007 | Fox |
| 8,113,986 | B2 | 2/2012 | Hahlbeck et al. |
| 8,216,108 | B2 * | 7/2012 | Montestruc ........... F16H 57/082 475/331 |
| 8,920,284 | B2 | 12/2014 | Fox |
| 9,663,225 | B1 | 5/2017 | Kooiman et al. |
| 10,330,174 | B2 | 6/2019 | Nies et al. |
| 11,111,014 | B2 * | 9/2021 | Gilliland ................ F16H 57/02 |
| 2007/0275816 | A1 | 11/2007 | Henderson |
| 2008/0153657 | A1 | 6/2008 | Smook et al. |
| 2012/0184404 | A1 | 7/2012 | Chobot et al. |
| 2017/0234421 | A1 | 8/2017 | Poster |

FOREIGN PATENT DOCUMENTS

| | | | |
|---|---|---|---|
| JP | 2010255737 A * | 11/2010 | |
| WO | 2011047448 A1 | 4/2011 | |
| WO | WO-2011064629 A1 * | 6/2011 | ............ F16H 1/2836 |

* cited by examiner

INTEGRAL FLEXURED CARRIERS FOR AIRCRAFT PLANETARY GEAR SYSTEMS

CROSS-REFERENCE TO RELATED APPLICATIONS

The present application is a continuation of co-pending application Ser. No. 16/661,118 filed Oct. 23, 2019.

TECHNICAL FIELD OF THE DISCLOSURE

The present disclosure relates, in general, to planetary gear systems for use on aircraft and, in particular, to planetary gear systems utilizing an integral carrier forming flexured carrier posts that support flexured roller races, thereby providing duel cantilevered motion to absorb loads from planet gears.

BACKGROUND

Planetary gear systems, also referred to as planetary or epicyclic gear trains, are used in many industries to provide a wide range of transmission ratios in a compact and lightweight layout. A typical arrangement of a planetary gear system includes the following elements: (1) an externally toothed sun gear, or sun wheel, coaxial with the gear train, (2) an internally toothed ring gear, or annulus, coaxial with the gear train, (3) two or more externally toothed planet gears, or pinions, that mesh with the sun gear and the ring gear and (4) a carrier coaxial with the gear train to support the planet gears. Any element of a planetary gear system may act as either an input or output of the system. In one example arrangement, the sun gear may be the input and the carrier may be the output while the ring gear remains fixed. Higher transmission ratios are attainable using a multistage, or stacked, planetary gear system in which the output of one stage of the multistage planetary gear system provides torque to the input of another stage of the multistage planetary gear system. Multistage planetary gear systems may include two or more stages depending on the transmission ratio requirements in a particular application. The final transmission ratio may be a multiple of the individual ratios of the stages.

Current carriers for planetary gears systems suffer from several drawbacks, especially in the aerospace industry. For example, traditional carriers are nonintegral and require fasteners to assemble the carrier posts to the carrier ring, increasing the risk of joint failure. Traditional carriers also rely on stiffness as a way to counteract loads imparted by the planet gears, which leads to a heavier and larger design. Other traditional carriers rely on spherical roller bearings to ensure proper alignment of the planet gears. Spherical roller bearings, however, typically increase the cost and complexity of the planetary gear system. Accordingly, a need has arisen for planetary gear system carriers that are lighter and more reliable for use in aerospace applications.

SUMMARY

In a first aspect, the present disclosure is directed to a drivetrain for an aircraft including an engine, a driveshaft configured to receive rotational energy from the engine and a gearbox including a planetary gear system configured to receive rotational energy from the driveshaft. The planetary gear system includes a sun gear, planet gears rotatable about the sun gear, a ring gear surrounding the planet gears such that the planet gears mate with the sun gear and the ring gear and an integral carrier forming flexured carrier posts. Each flexured carrier post supports a respective one of the planet gears and has a fixed proximal end and a cantilevered distal end. The planetary gear system also includes flexured roller races, each having a fixed end and a cantilevered end. The fixed end of each flexured roller race is coupled to the cantilevered distal end of a respective flexured carrier post. The planet gears are configured to engage with the flexured roller races to rotate about the flexured carrier posts. The cantilevered ends of the flexured roller races experience cantilevered motion to absorb loads from the planet gears.

In some embodiments, each planet gear may form a bearing aperture, and the planetary gear system may include rollers disposed in the bearing apertures of the planet gears and configured to roll against the flexured roller races to enable rotation of the planet gears about the flexured carrier posts. In such embodiments, the rollers may be flat cylindrical rollers and/or the rotational axes of the rollers may be substantially parallel. In some embodiments, the integral carrier may be monolithically formed from a substantially homogenous material. In certain embodiments, the integral carrier may form a ring and the flexured carrier posts may project from the ring. In such embodiments, the integral carrier may jointlessly connect the flexured carrier posts to the ring.

In some embodiments, the cantilevered distal ends of the flexured carrier posts may experience cantilevered motion to absorb loads from the planet gears. In such embodiments, the cantilevered distal ends of the flexured carrier posts and the cantilevered ends of the flexured roller races may be configured to simultaneously experience cantilevered motion to maintain alignment of the planet gears. In certain embodiments, each flexured carrier post may form a retention ridge and the fixed end of each flexured roller race may be configured to abut against the retention ridge of a respective flexured carrier post. In such embodiments, the fixed end of each flexured roller race may form a tapered inner wall configured to abut against the retention ridge of a respective flexured carrier post.

In some embodiments, the fixed end of each flexured roller race may be press fit to the cantilevered distal end of a respective flexured carrier post. In certain embodiments, the cantilevered ends of the flexured roller races may each form a roller retaining ridge projecting radially outward and configured to retain a plurality of rollers. In some embodiments, an annular gap may be formed between each flexured roller race and a respective flexured carrier post to permit cantilevered motion of the flexured roller races. In certain embodiments, each flexured roller race may have a generally hollow cylindrical shape.

In some embodiments, the planetary gear system may include race retainers coupled to the cantilevered distal ends of the flexured carrier posts to retain the flexured roller races on the flexured carrier posts. In such embodiments, the race retainers may be shaped to contour the fixed ends of the flexured roller races. In certain embodiments, the planetary gear system may include race retainer supports configured to support the race retainers such that the race retainers are interposed between the flexured roller races and the race retainer supports. In some embodiments, the race retainers may each form a roller retaining ridge projecting radially outward and configured to retain a plurality of rollers. In certain embodiments, the flexured carrier posts may each form a retention ridge and the fixed ends of the flexured roller races may be sandwiched between the retention ridges and the race retainers.

In some embodiments, the planetary gear system may be a multistage planetary gear system including a first stage and a second stage, the second stage including the sun gear, the planet gears, the ring gear, the integral carrier and the flexured roller races. In such embodiments, the first and second stages may be high speed and low speed stages, respectively. In certain embodiments, the integral carrier may be coupled to an output shaft.

In a second aspect, the present disclosure is directed to a tiltrotor aircraft including a fuselage, a wing supported by the fuselage and first and second pylon assemblies rotatably coupled to outboard ends of the wing. Each pylon assembly includes an internal driveshaft, a proprotor assembly including a plurality of proprotor blades and a mast and a gearbox including a planetary gear system configured to receive rotational energy from the internal driveshaft. The planetary gear system includes a sun gear, planet gears rotatable about the sun gear, a ring gear surrounding the planet gears such that the planet gears mate with the sun gear and the ring gear and an integral carrier forming flexured carrier posts. Each flexured carrier post supports a respective one of the planet gears and has a fixed proximal end and a cantilevered distal end. The planetary gear system also includes flexured roller races each having a fixed end and a cantilevered end. The fixed end of each flexured roller race is coupled to the cantilevered distal end of a respective flexured carrier post. The planet gears are configured to engage with the flexured roller races to rotate about the flexured carrier posts. The cantilevered ends of the flexured roller races experience cantilevered motion to absorb loads from the planet gears.

In some embodiments, the fuselage may include an engine and the wing may include an interconnected driveshaft configured to transfer rotational energy from the engine to the pylon assemblies. In such embodiments, the internal driveshafts may transfer rotational energy from the interconnected driveshaft to the planetary gear systems. In certain embodiments, the pylon assemblies may each include a spiral bevel gearbox interposed between the interconnected driveshaft and the planetary gear system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
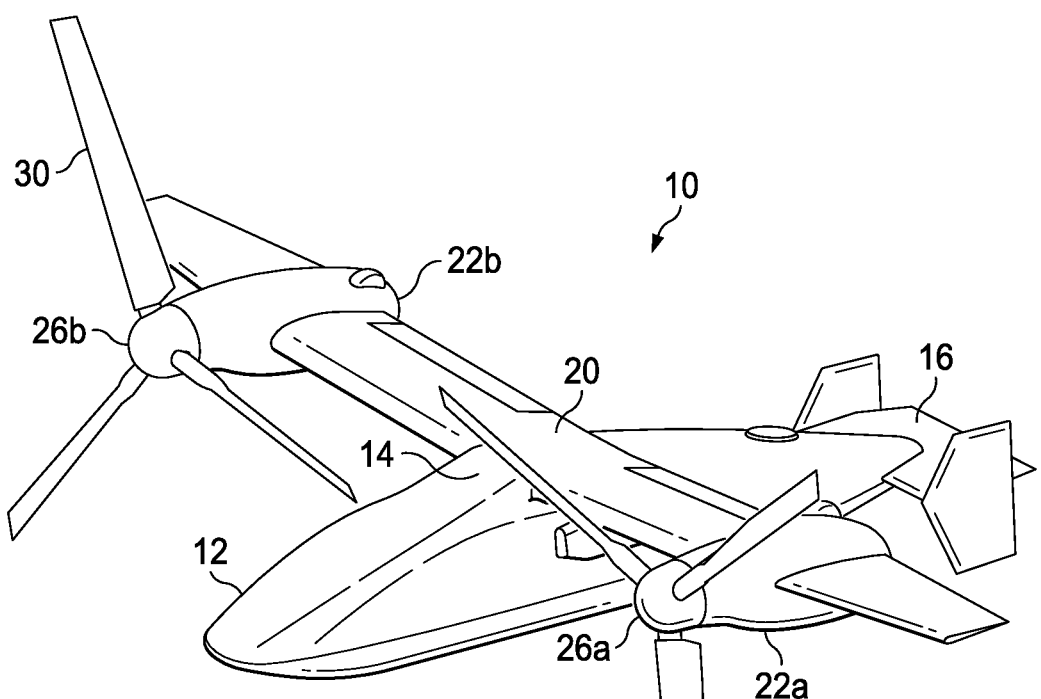
FIGS. 1A-1C are schematic illustrations of a tiltrotor aircraft utilizing an integral carrier with flexured carrier posts and flexured roller races in accordance with embodiments of the present disclosure.
Figure 1B:
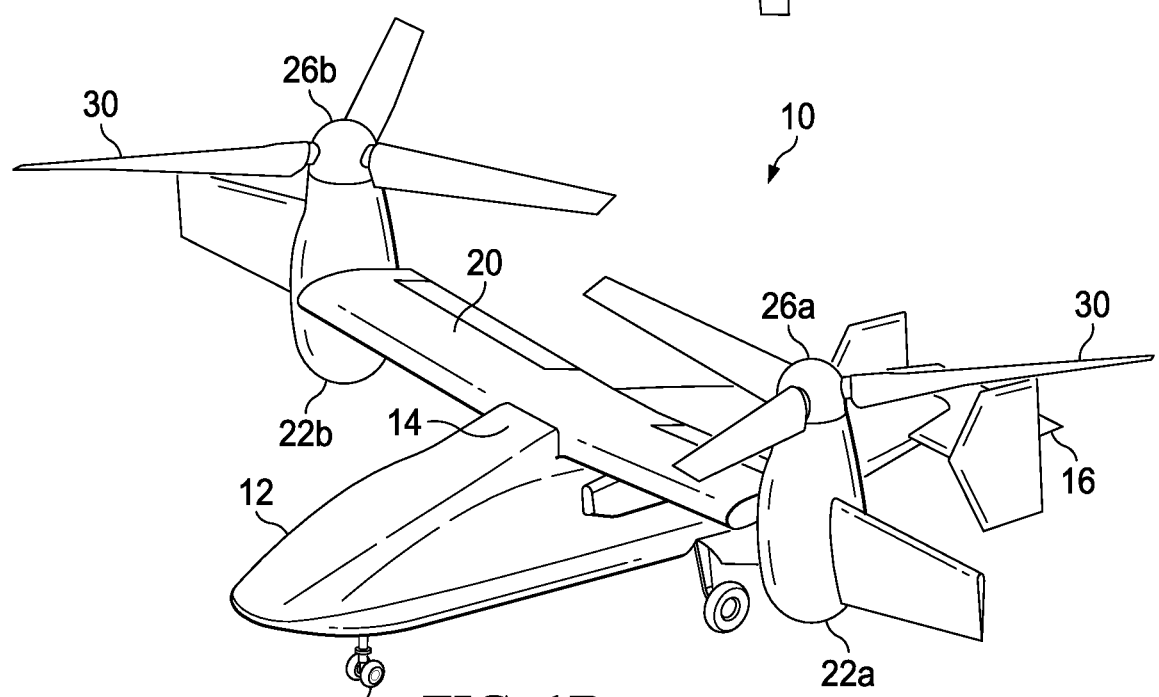
Figure 1C:
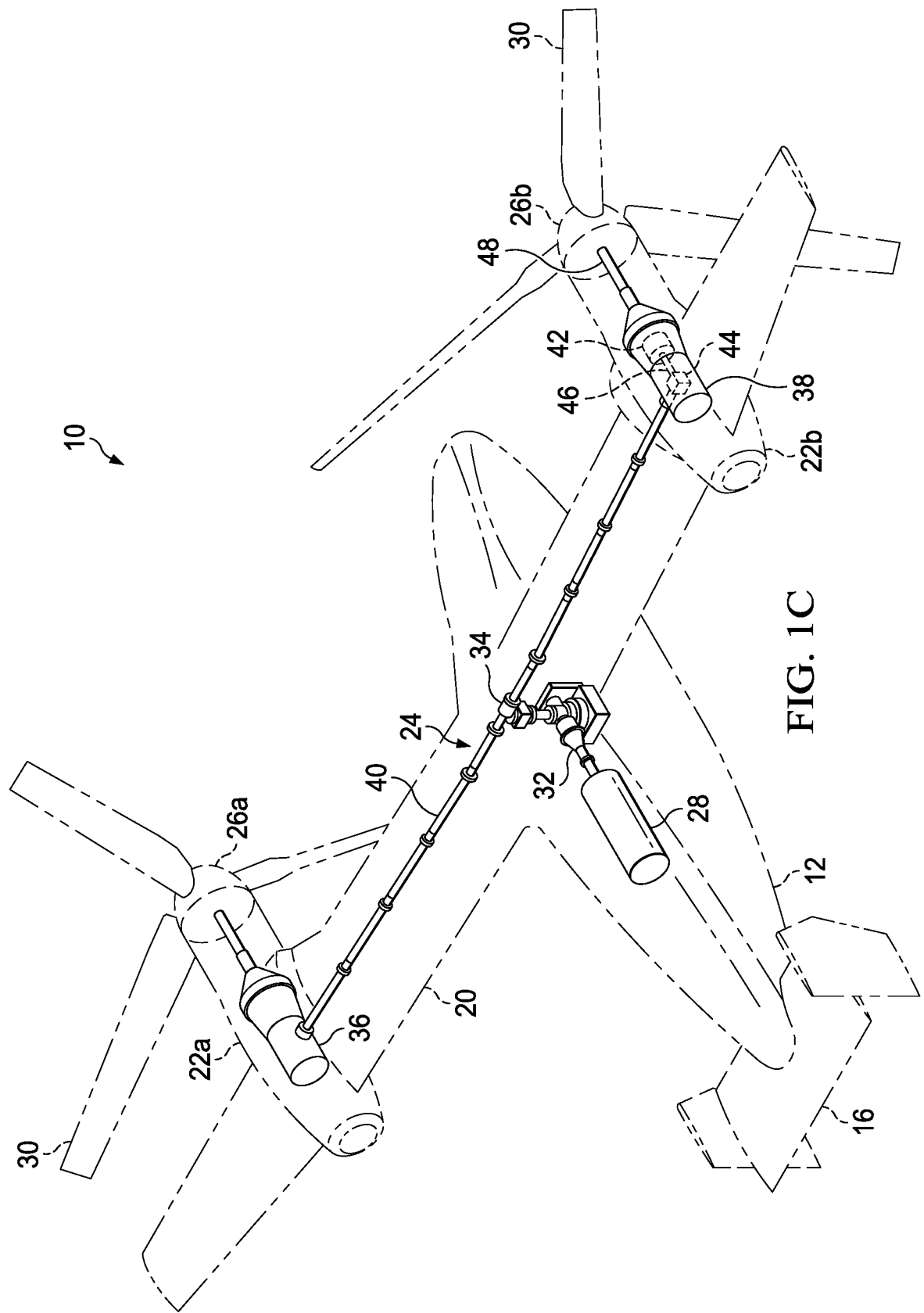

Referring to FIGS. 1A-1C in the drawings, a tiltrotor aircraft is schematically illustrated and generally designated 10. Tiltrotor aircraft 10 includes a fuselage 12, a wing mount assembly 14 and a tail assembly 16. Tail assembly 16 may have control surfaces operable for horizontal and/or vertical stabilization during flight. A landing gear system 18 provides ground support for tiltrotor aircraft 10. A wing 20 is supported by fuselage 12 and wing mount assembly 14.

Coupled to the outboard ends of wing 20 are pylon assemblies 22a, 22b. Pylon assembly 22a is rotatable relative to wing 20 between a generally horizontal orientation, as best seen in FIGS. 1A and 1C, and a generally vertical orientation, as best seen in FIG. 1B. Pylon assembly 22a includes a rotatable portion of a drivetrain 24 and a proprotor assembly 26a that is rotatable responsive to torque and rotational energy provided by an engine or motor 28 of drivetrain 24. Likewise, pylon assembly 22b is rotatable relative to wing 20 between a generally horizontal orientation, as best seen in FIGS. 1A and 1C, and a generally vertical orientation, as best seen in FIG. 1B. Pylon assembly 22b includes a rotatable portion of drivetrain 24 and a proprotor assembly 26b that is rotatable responsive to torque and rotational energy provided by engine 28 of drivetrain 24. In the illustrated embodiment, proprotor assemblies 26a, 26b each include three proprotor blade assemblies 30. It should be understood by those having ordinary skill in the art, however, that proprotor assemblies 26a, 26b could alternatively have a different number of proprotor blade assemblies, either less than or greater than three. In addition, it should be understood that the position of pylon assemblies 22a, 22b, the angular velocity or revolutions per minute (RPM) of proprotor assemblies 26a, 26b, the pitch of proprotor blade assemblies 30 and the like may be controlled by the pilot of tiltrotor aircraft 10 and/or a flight control system to selectively control the direction, thrust and lift of tiltrotor aircraft 10 during flight.

FIGS. 1A and 1C illustrate tiltrotor aircraft 10 in a forward flight mode or airplane flight mode, in which proprotor assemblies 26a, 26b are positioned to rotate in a substantially vertical plane and provide a forward thrust while a lifting force is supplied by wing 20 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor assemblies 26a, 26b are positioned to rotate in a substantially horizontal plane and provide a vertical thrust such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor assemblies 26a, 26b positioned between airplane flight mode and helicopter flight mode, which can be referred to as conversion flight mode.

Tiltrotor aircraft 10 uses drivetrain 24 including engine 28 and a transmission subsystem including gearboxes 32, 34 and pylon transmissions 36, 38 for providing torque and rotational energy to each proprotor assembly 26a, 26b via interconnected driveshaft 40 located in wing 20. Gearboxes 32, 34 are located in fuselage 12 and pylon transmissions 36, 38 are located in pylon assemblies 22a, 22b. Gearboxes 32, 34 and pylon transmissions 36, 38 may employ any type or combination of gears or gearboxes such as a spiral bevel gearbox, helical gearbox, coaxial helical inline gearbox, bevel helical gearbox, skew bevel helical gearbox, worm reduction gearbox, planetary gearbox, spur gearbox or any other assembly utilizing gears. For example, gearboxes 32, 34 may be, and pylon transmissions 36, 38 may include, spiral bevel gearboxes. In other embodiments, each pylon assembly 22a, 22b houses a drive system, such as an engine, motor and/or transmission subsystem, for supplying torque and rotational energy to a respective proprotor assembly 26a, 26b. In such embodiments, the drive systems of each pylon assembly 22a, 22b may be coupled together via one or more driveshafts located in wing 20 such that either drive system can serve as a backup to the other drive system in the event of a failure. In tiltrotor aircraft having both pylon and fuselage mounted drive systems, the fuselage mounted drive system may serve as a backup drive system in the event of failure of either or both of the pylon mounted drive systems.

Pylon transmission 38 is substantially similar to pylon transmission 36 therefore, for sake of efficiency, certain features will be disclosed only with regard to pylon transmission 38. One having ordinary skill in the art, however, will fully appreciate an understanding of pylon transmission 36 based upon the disclosure herein of pylon transmission 38. Pylon transmission 38 includes gearbox 42 and a nonparallel gearbox 44 interposed between interconnected driveshaft 40 and gearbox 42. Nonparallel gearbox 44 transfers torque between nonparallel and/or orthogonal driveshafts, namely interconnected driveshaft 40 and internal driveshaft 46. Internal driveshaft 46 is internal to pylon transmission 38 and transfers rotational energy from nonparallel gearbox 44 to gearbox 42. In one non-limiting example, nonparallel gearbox 44 is a spiral bevel gearbox.

Gearbox 42 includes a planetary gear system configured to receive rotational energy from internal driveshaft 46 as an input and transmit rotational energy to mast 48 of proprotor assembly 26b as an output. The planetary gear system provides a predetermined transmission ratio between internal driveshaft 46 and mast 48. In other examples, gearbox 42 includes a multistage planetary gear system with two or more stages each including a sun gear, a ring gear, two or more planet gears meshed with the sun gear and the ring gear and a carrier to support the planet gears. Previous aircraft with planetary gear systems have relied on heavy and stiff carriers, lead correction and/or expensive specialized bearings to counteract the loads imparted by the planet gears. The illustrative embodiments address these and other issues by implementing an integral carrier forming flexured carrier posts each supporting a respective one of the planet gears. Flexured roller races are coupled to the cantilevered ends of the flexured carrier posts to provide duel simultaneous flex modes that absorb loads from, and maintain proper alignment of, the planet gears. By counteracting planet gear loads using integral and flexured components, the integral carrier and flexured roller races of the illustrative embodiments reduce the weight, volume, cost and joint wear of the planetary gear system.

It should be appreciated that tiltrotor aircraft 10 is merely illustrative of a variety of aircraft that can implement the embodiments disclosed herein. Indeed, integral carriers with flexured carrier posts and flexured roller races may be implemented on any aircraft. Other aircraft implementations can include hybrid aircraft, tiltwing aircraft, quad tiltrotor aircraft, unmanned aircraft, gyrocopters, propeller-driven airplanes, compound helicopters, quadcopters, drones, jets, helicopters and the like. As such, those skilled in the art will recognize that integral carriers with flexured carrier posts and flexured roller races can be integrated into a variety of aircraft configurations. It should be appreciated that even though aircraft are particularly well-suited to implement the embodiments of the present disclosure, non-aircraft vehicles and devices can also implement the embodiments.

Figure 2A:
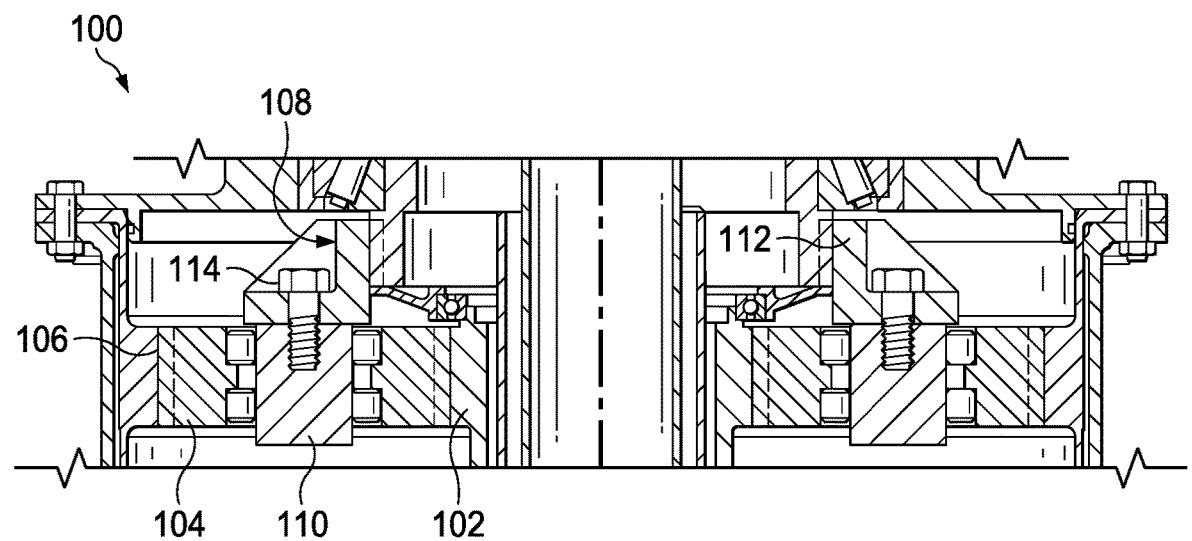
FIGS. 2A-2D are various views of different planetary gear systems and carriers used on previous aircraft.
Figure 2B:
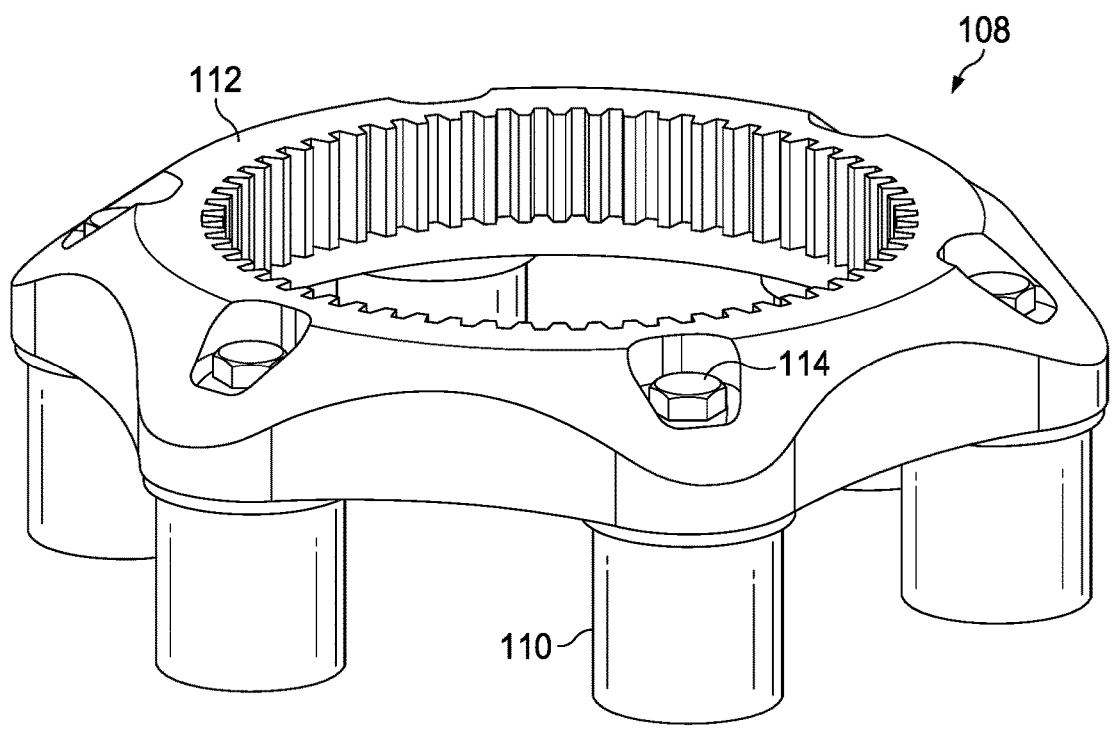

Referring to FIGS. 2A-2D in the drawings, carriers for planetary gear systems in previous aircraft are illustrated. In FIGS. 2A-2B, planetary gear system 100 includes sun gear 102, planet gears 104, ring gear 106 and carrier 108. Carrier 108 supports planet gears 104, with each planet gear 104 revolving around a respective carrier post 110 of carrier 108. Carrier 108 is assembled from several structurally separate parts including ring 112 and carrier posts 110.

Because ring 112 is structurally separate from carrier posts 110, a bolted or other type of joint is required between ring 112 and each carrier post 110. In the illustrated embodiment, bolts 114 are used to couple carrier posts 110 to ring 112. As planet gears 104 impart loads on carrier posts 110, the joints between carrier posts 110 and ring 112 including bolts 114 are subject to joint wear and failure, increasing maintenance requirements and reducing the reliability of planetary gear system 100. Carrier 108 also relies on a high degree of stiffness to resist the loads imparted by planet gears 104, thereby requiring a substantial amount of material and weight to achieve adequate stiffness. Reliance on the stiffness of carrier 108 requires lead correction in the gear teeth of planet gears 104 to maintain proper alignment of planet gears 104.

Figure 2C:
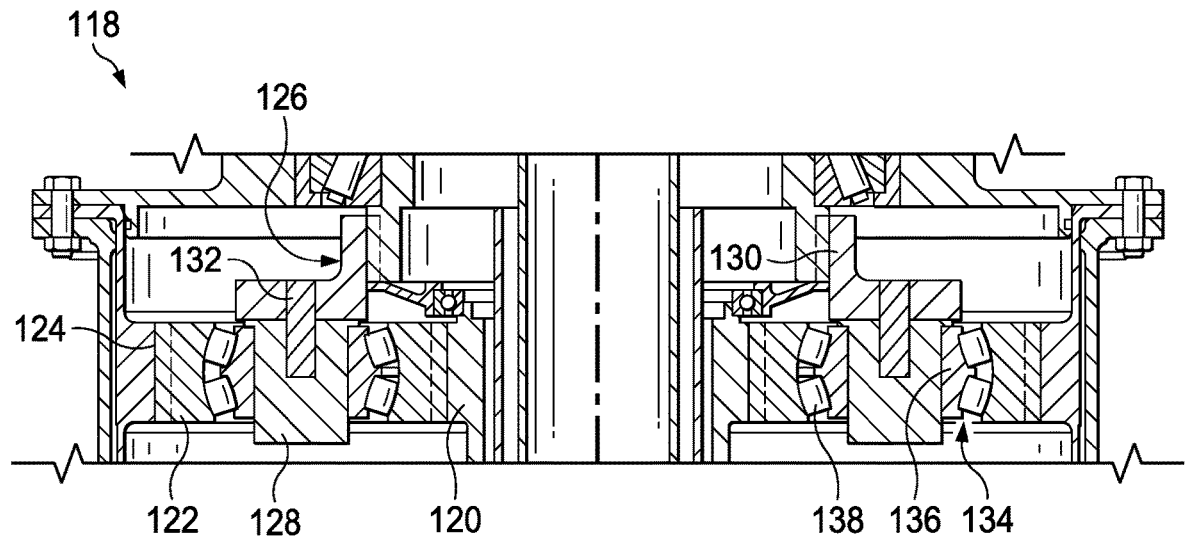
Figure 2D:
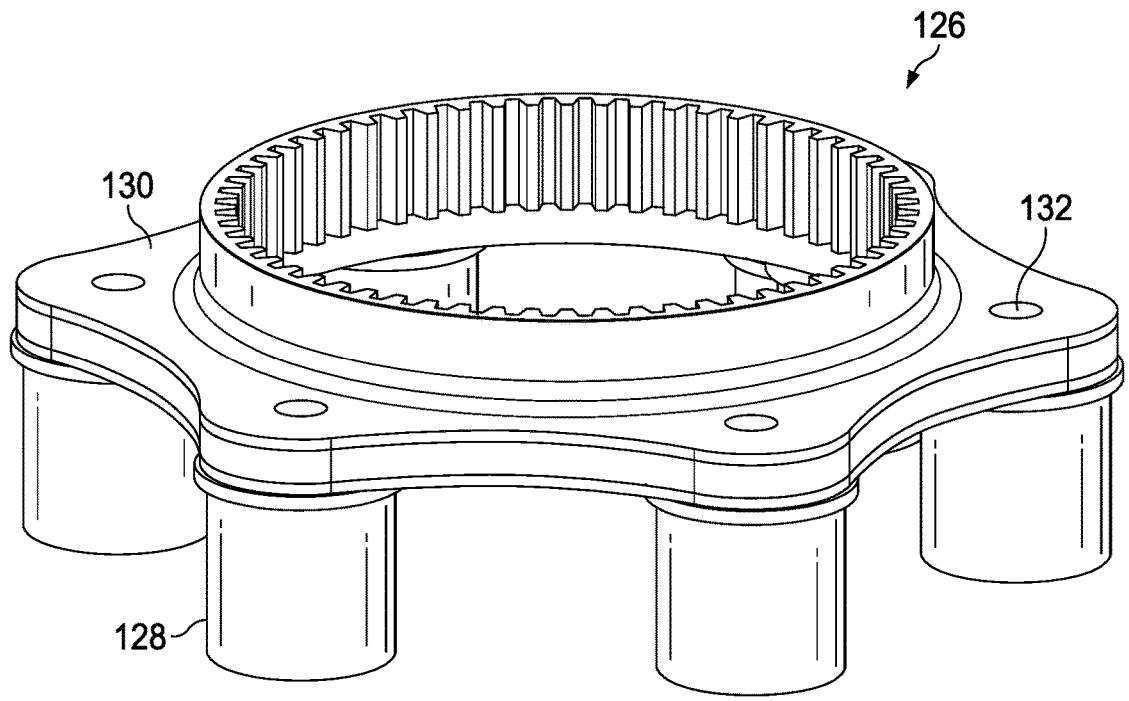

In FIGS. 2C-2D, planetary gear system 118 includes sun gear 120, planet gears 122, ring gear 124 and carrier 126. Like carrier 108 in FIGS. 2A-2B, carrier 126 is nonintegral and includes joints between carrier posts 128 and ring 130. In the illustrated embodiment, carrier posts 128 are connected to ring 130 using pins 132, subjecting carrier 126 to joint wear and adding to the weight penalty of carrier 126. Carrier 126 also relies on spherical bearings 134 to allow planet gears 122 to rotate back and forth and maintain alignment. Spherical bearings 134 include tapered races 136 and tapered rollers 138 having nonparallel axes of rotation. Spherical bearings 134, particularly in the aerospace context, are costly, complex and difficult to source. Spherical bearings 134 may also be heavier than traditional bearings.

Referring to FIGS. 3A-3F in the drawings, a gearbox including a multistage planetary gear system is schematically illustrated and generally designated 200. More particularly, multistage planetary gear system 200 is a two stage planetary gear system that may be utilized in any system of an aircraft such as in drivetrain 24 of tiltrotor aircraft 10 in FIGS. 1A-1C. For example, multistage planetary gear system 200 may be utilized in gearbox 42 to transmit torque originating from engine 28 to proprotor assembly 26b at a predetermined transmission ratio as shown in FIGS. 1A-1C. Multistage planetary gear system 200 receives rotational energy from driveshaft 202. Non-limiting examples of driveshaft 202 include interconnected driveshaft 40 or internal driveshaft 46 in FIGS. 1A-1C. Driveshaft 202 is coupled to high speed sun gear 204. High speed planet gears 206 are positioned between high speed sun gear 204 and high speed ring gear 208 and rotate about high speed sun gear 204 responsive to the rotation of high speed sun gear 204. High speed planet gears 206 mesh with both high speed sun gear 204 and high speed ring gear 208. High speed carrier 210 provides support to high speed planet gears 206 and rotates about centerline 212 with high speed planet gears 206. High speed carrier 210 is coupled to low speed sun gear 214 via splined connection 216 and provides rotational energy thereto. Low speed sun gear 214 transfers rotational energy to low speed planet gears 218, which rotate about low speed sun gear 214 and are interposed between low speed sun gear 214 and low speed ring gear 220. Low speed planet gears 218 mesh with both low speed sun gear 214 and low speed ring gear 220. Low speed planet gears 218 are supported by low speed integral carrier 222, which is coupled to output shaft 224 via splined connection 226. In one non-limiting example, output shaft 224 may be a mast such as mast 48 in FIGS. 1A-1C to provide rotational energy to a proprotor or rotor assembly. Sun gears 204, 214, ring gears 208, 220, high speed carrier 210 and low speed integral carrier 222 are coaxial relative to centerline 212. In the illustrated embodiment, ring gears 208, 220 do not rotate about centerline 212.

The number of high speed planet gears 206 may differ from the number of low speed planet gears 218. For example, multistage planetary gear system 200 may include five high speed planet gears 206 and six low speed planet gears 218. Multistage planetary gear system 200 may include any number of high speed and low speed planet gears 206, 218. An increase in the number of planet gears 206, 218 may increase the load capacity and torsional rigidity of multistage planetary gear system 200. Additional planet gears also divide the load imparted by planet gears 206, 218 on adjacent gears, resulting in less deflection and gear teeth wear. While high speed sun gear 204 acts as the input and low speed integral carrier 222 acts as the output for multistage planetary gear system 200, any element of multistage planetary gear system 200 may act as either an input or output. For example, high speed carrier 210 may be coupled to driveshaft 202 and low speed sun gear 214 may be coupled to output shaft 224. It will be appreciated by one of ordinary skill in the art that the input and output for multistage planetary gear system 200 may be configured in a variety of ways to achieve a desired transmission ratio. Multistage planetary gear system 200 has two stages with first stage 228 including high speed sun gear 204, high speed planet gears 206, high speed ring gear 208 and high speed carrier 210 and second stage 230 including low speed sun gear 214, low speed planet gears 218, low speed ring gear 220 and low speed integral carrier 222. Second stage 230 is downstream from first stage 228. In other embodiments, multistage planetary gear system 200 may include three, four or more stages, with the number of stages depending on the desired transmission ratio. In other embodiments, first stage 228 may be a low speed stage and second stage 230 may be a high speed stage. Central conduit 232 may be used to pass equipment such as wires through the center of multistage planetary gear system 200.

Figure 3A:
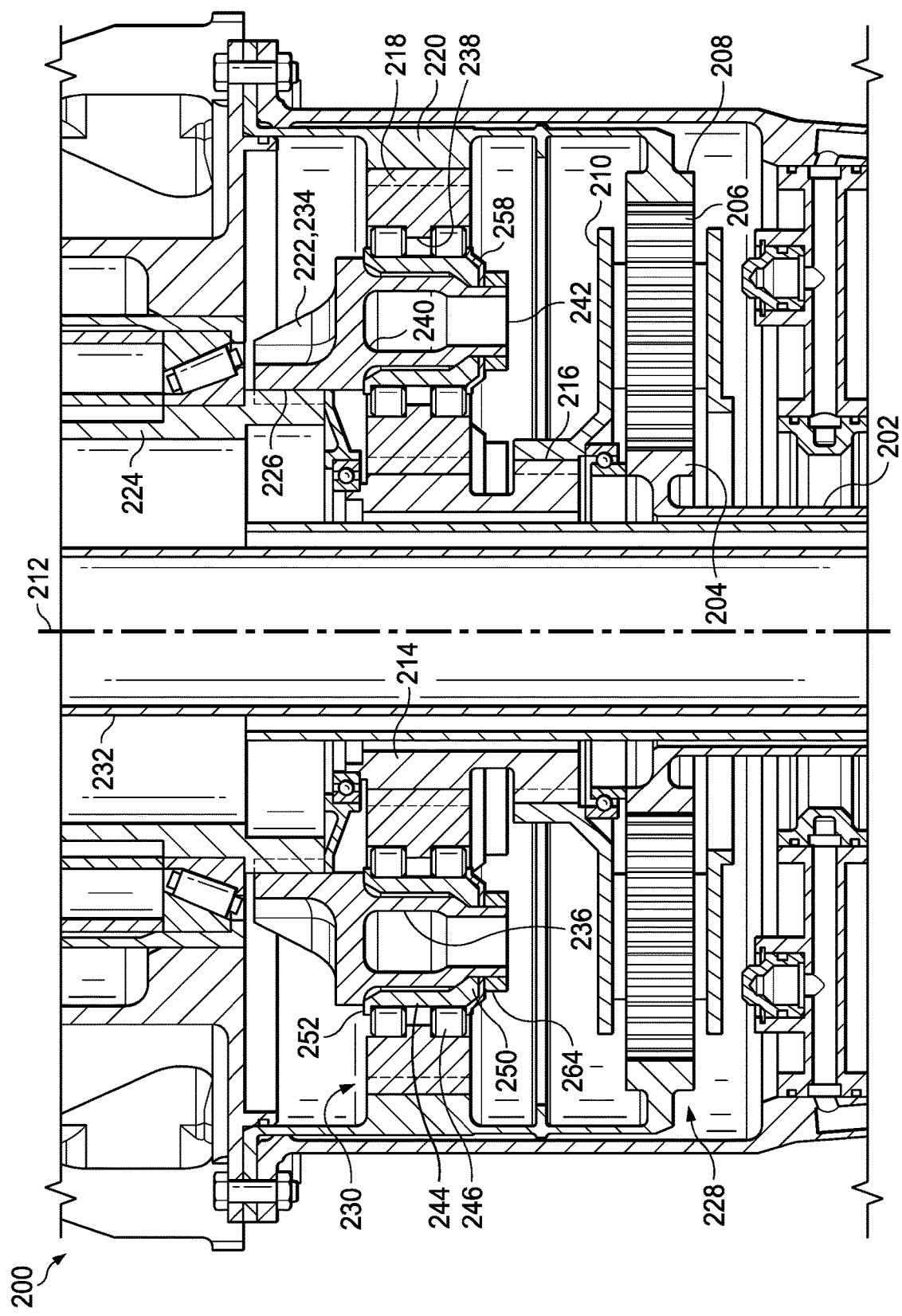
FIGS. 3A-3F are various views of a multistage planetary gear system including an integral carrier with flexured carrier posts and flexured roller races in accordance with embodiments of the present disclosure.
Figure 3B:
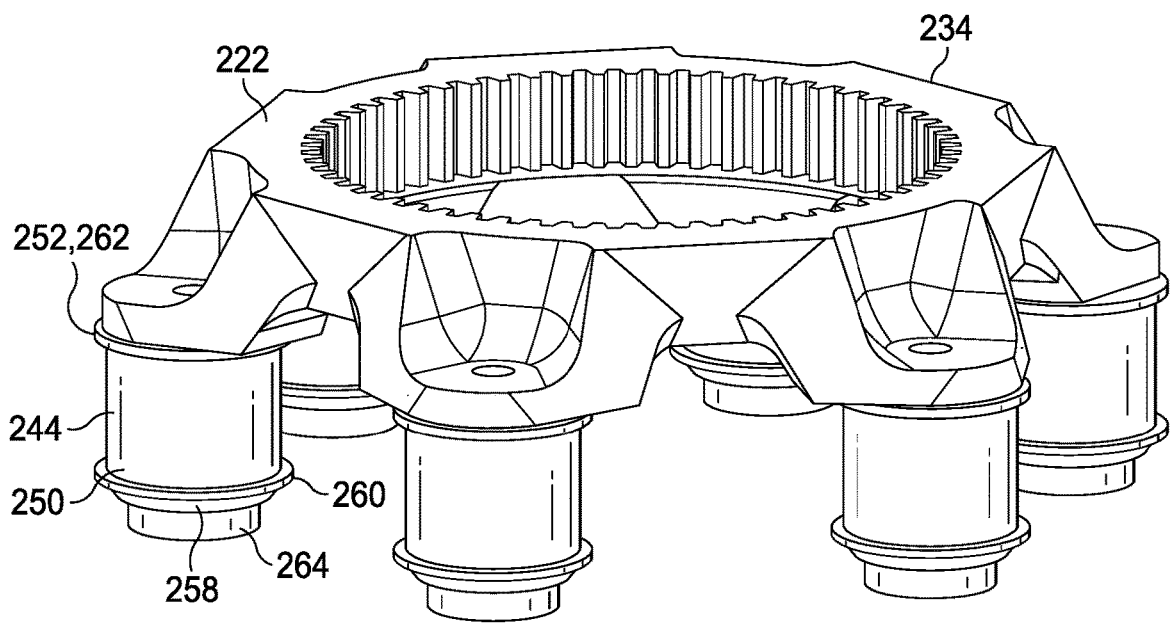
Figure 3C:
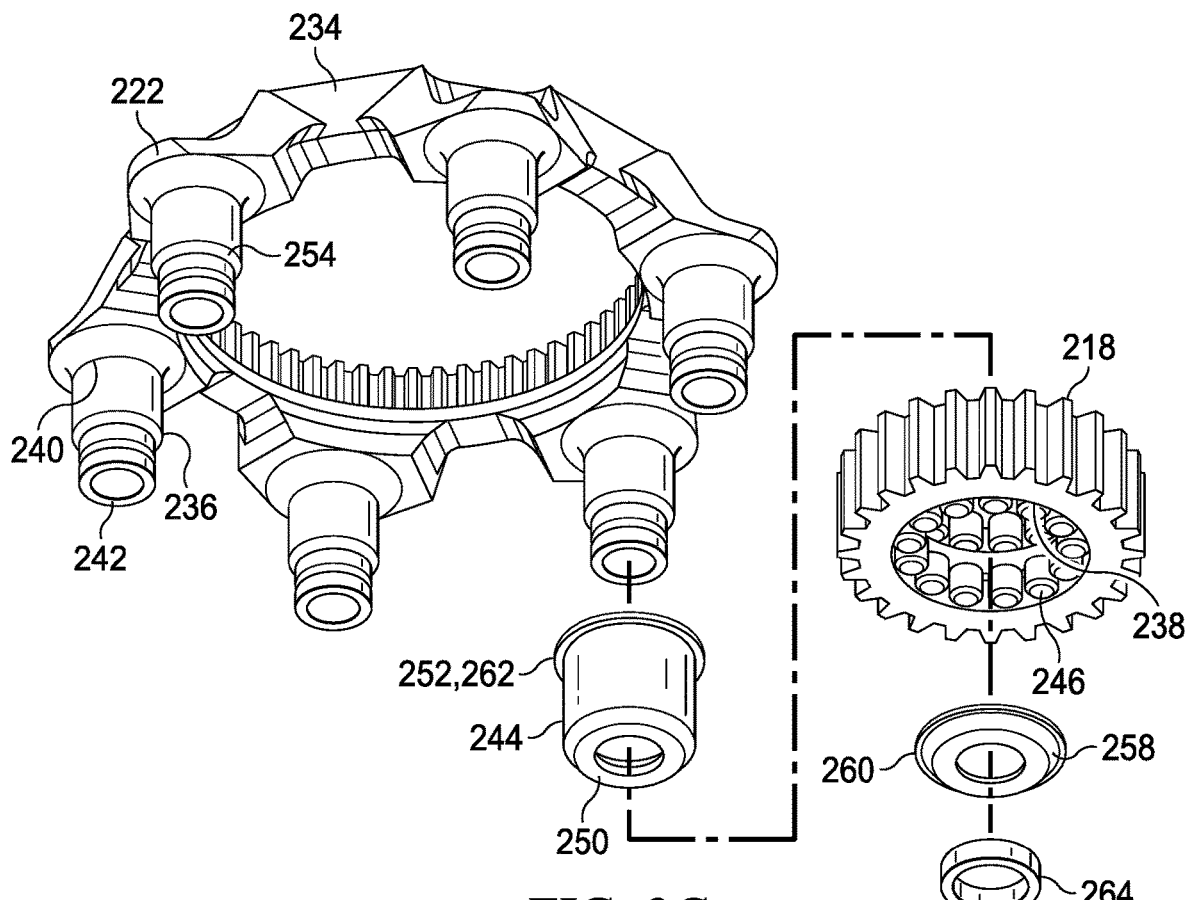
Figure 3D:
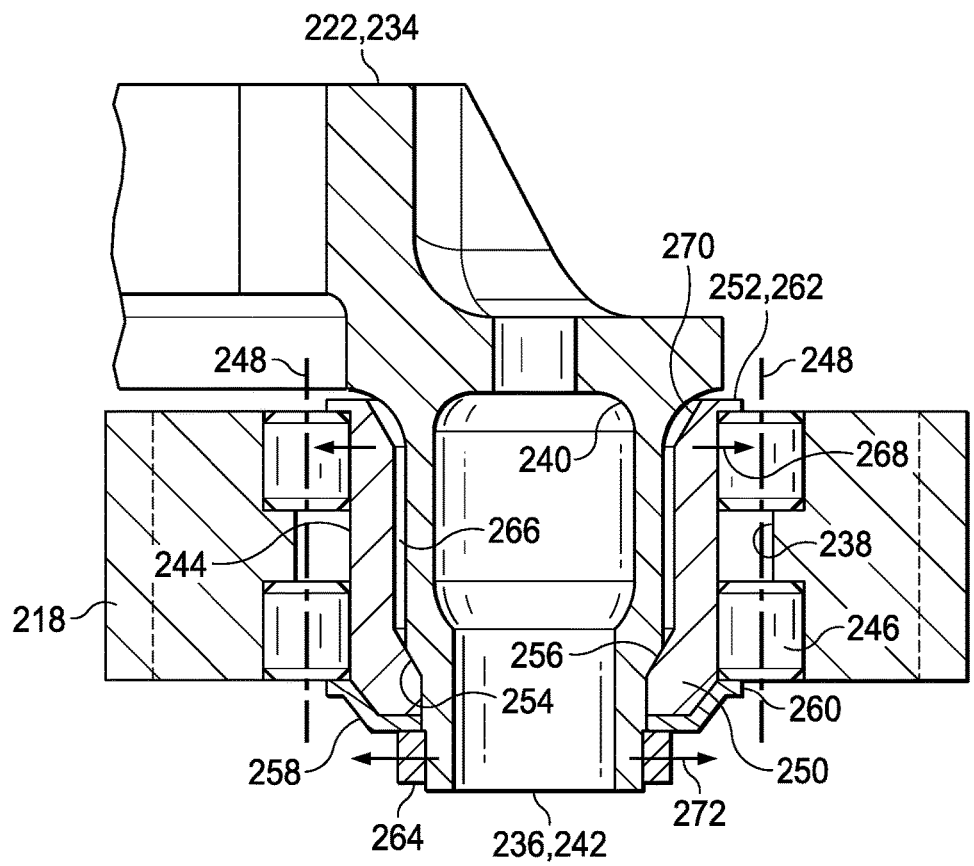

Low speed integral carrier 222 forms ring 234 and flexured carrier posts 236 projecting from ring 234. Each flexured carrier post 236 supports a respective low speed planet gear 218. Flexured carrier posts 236 extend through bearing apertures 238 of low speed planet gears 218. Each flexured carrier post 236 has a fixed proximal end 240 and a cantilevered distal end 242. In the illustrated embodiment, low speed integral carrier 222, which includes ring 234 and flexured carrier posts 236, is monolithically formed from a substantially homogenous material such that flexured carrier posts 236 are jointlessly connected to ring 234. Flexured roller races 244 form generally hollow cylindrical shapes and are coupled to flexured carrier posts 236 to provide surfaces with which low speed planet gears 218 engage via rollers 246 to rotate about flexured carrier posts 236. Low speed integral carrier 222 and flexured roller races 244 may be manufactured using any additive, subtractive or formative manufacturing technique including, but not limited to, extrusion, machining, 3D printing, stamping, welding or casting as well as others. Flexured carrier posts 236, flexured roller races 244 and rollers 246 are disposed in bearing apertures 238 of low speed planet gears 218. Rollers 246 are interposed between flexured roller races 244 and low speed planet gears 218 and are configured to roll against flexured roller races 244 to enable rotation of low speed planet gears 218 about flexured carrier posts 236. Rollers 246 are flat and cylindrical rollers having substantially parallel rotational axes 248, as best seen in FIG. 3D. In other embodiments, rotational axes 248 of rollers 246 may be nonparallel. Other types or shapes of rollers may also be used in lieu of or in combination with rollers 246 including ball rollers, tapered rollers, barrel rollers and/or needle rollers.

Each flexured roller race 244 has a fixed end 250 and a cantilevered, or free, end 252. Fixed end 250 of each flexured roller race 244 is press fit to cantilevered distal end 242 of a respective flexured carrier post 236, which may also be referred to as an interference, friction or piloted fit. Each flexured carrier post 236 forms a retention ridge 254 and each flexured roller race 244 forms a tapered inner wall 256 configured to abut against retention ridge 254 of a respective flexured carrier post 236. Race retainers 258 are coupled to cantilevered distal ends 242 of flexured carrier posts 236 to retain flexured roller races 244 on flexured carrier posts 236. More particularly, fixed ends 250 of flexured roller races 244 are sandwiched between retention ridges 254 of flexured carrier posts 236 and race retainers 258. Race retainers 258 are shaped to contour fixed ends 250 of flexured roller races 244, although in other embodiments race retainers 258 may form other shapes including flat disks or washers. Race retainers 258 each form an annular roller retaining ridge 260 that projects radially outward. Cantilevered ends 252 of flexured roller races 244 also each form an annular roller retaining ridge 262 that projects radially outward. Roller retaining ridges 260, 262 are configured to retain rollers 246 on flexured roller races 244.

Race retainer supports 264 support race retainers 258 by biasing or pressing tapered inner walls 256 of flexured roller races 244 against retention ridges 254 of flexured carrier posts 236. Race retainers 258 are interposed between flexured roller races 244 and race retainer supports 264. In some embodiments, race retainer supports 264 may be threaded onto cantilevered distal ends 242 of flexured carrier posts 236. For example, race retainer supports 264 may be threaded nuts. Annular gap 266 is formed between flexured carrier posts 236 and flexured roller races 244 to permit cantilevered motion 268 of flexured roller races 244. The size of annular gap 266 may vary depending on the application. In one non-limiting example, annular gap 266 may provide clearance between flexured carrier posts 236 and flexured roller races 244 in a range between one thousandth of an inch and 100 thousandths of an inch such as five thousandths of an inch. Tapered inner walls 270 at cantilevered ends 252 of flexured roller races 244 provide additional clearance for cantilevered motion 268 of flexured roller races 244.

Figure 3E:
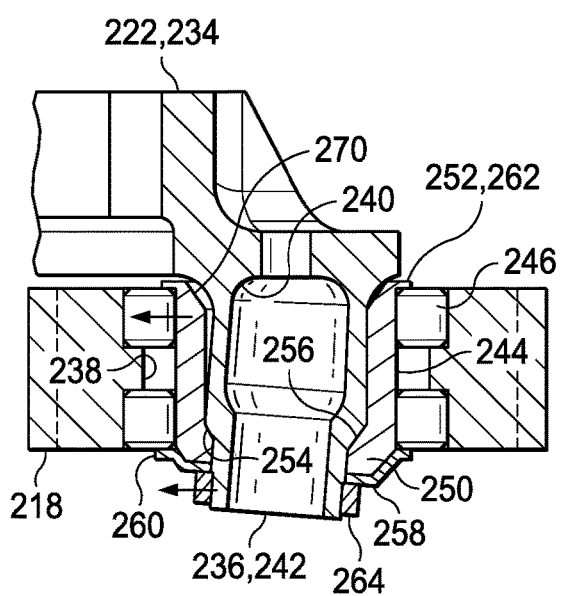
Figure 3F:
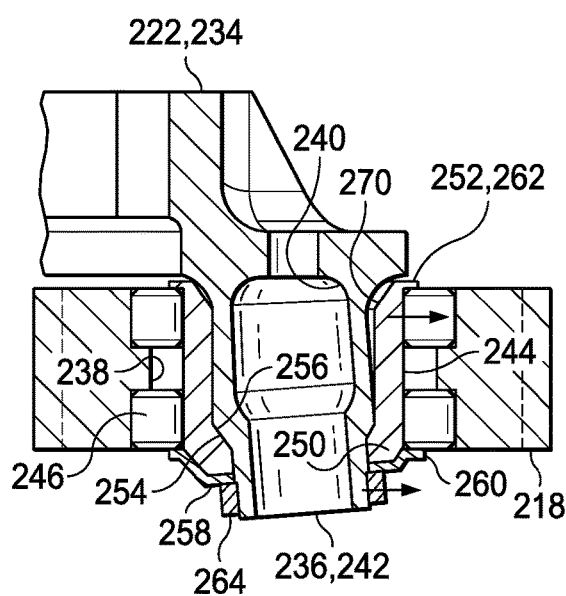

As best seen in FIGS. 3D-3F, two flexures take place to absorb loads from, and maintain alignment of, low speed planet gears 218 during each cycle. More particularly, cantilevered ends 252 of flexured roller races 244 experience cantilevered motion 268 and cantilevered distal ends 242 of flexured carrier posts 236 experience cantilevered motion 272. The movement of flexured carrier post 236 and flexured roller race 244 in FIGS. 3E-3F is exaggerated for purposes of illustration. Cantilevered motion 268 of flexured roller races 244 and cantilevered motion 272 of flexured carrier posts 236 occur simultaneously to maintain alignment of low speed planet gears 218. Despite loads imparted by low speed planet gears 218, the outer surface of flexured roller races 244 presented to rollers 246 remains substantially vertical, or flat relative to rollers 246, as cantilevered motion 268 of flexured roller races 244 compensates for cantilevered motion 272 of flexured carrier posts 236. Such an arrangement soft mounts low speed planet gears 218 so that low speed planet gears 218 may continually shift and uneven loading may be equalized. The dual flexibility of flexured carrier posts 236 and flexured roller races 244 also allows low speed planet gears 218 to square up into their most efficient position relative to adjacent gears. The flexibility of flexured carrier posts 236 and flexured roller races 244 requires less stiffness of low speed integral carrier 222 since low speed integral carrier 222 is not required to absorb the entire load imparted by low speed planet gears 218. This lowers the cost, amount of material and weight of low speed integral carrier 222, as low speed integral carrier 222 becomes stress-sized instead of stiffness-sized. The flexibility of flexured carrier posts 236 and flexured roller races 244 also provides enough compliance to achieve equal load sharing without using spherical roller bearings or lead correction. Low speed integral carrier 222 has less risk of joint failure since ring 234 and flexured carrier posts 236 are monolithically formed. It will be appreciated by one of ordinary skill in the art that an integral carrier with flexured carrier posts and flexured roller races may be used in any stage of a multistage planetary gear system including either or both of first stage 228 and/or second stage 230.

Figure 4:
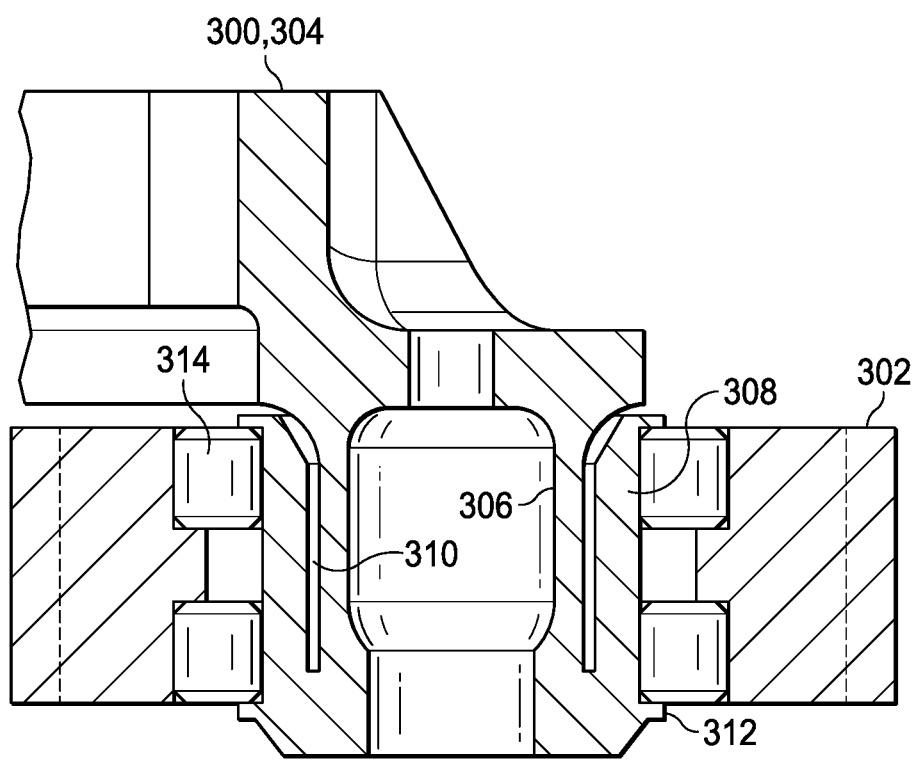
FIG. 4 is a cross-sectional view of an integral carrier forming flexured carrier posts and flexured roller races in accordance with embodiments of the present disclosure.

Referring to FIG. 4 in the drawings, integral carrier 300 and planet gear 302 of a planetary gear system are schematically illustrated. Ring 304, flexured carrier posts 306 and flexured roller races 308 are integral and monolithically formed from a substantially homogenous material to remove all joints therebetween. Gap 310 is formed between flexured carrier post 306 and flexured roller race 308 to allow flexured roller race 308 to experience cantilevered motion as described above. The elimination of joints between flexured carrier posts 306 and flexured roller races 308 as well as the elimination of race retainers and race retainer supports to support flexured roller race 308 reduces the amount of material and weight of integral carrier 300. Integral carrier 300 also forms roller retaining ridges 312 to retain rollers 314 on flexured roller races 308.

Figure 5A:
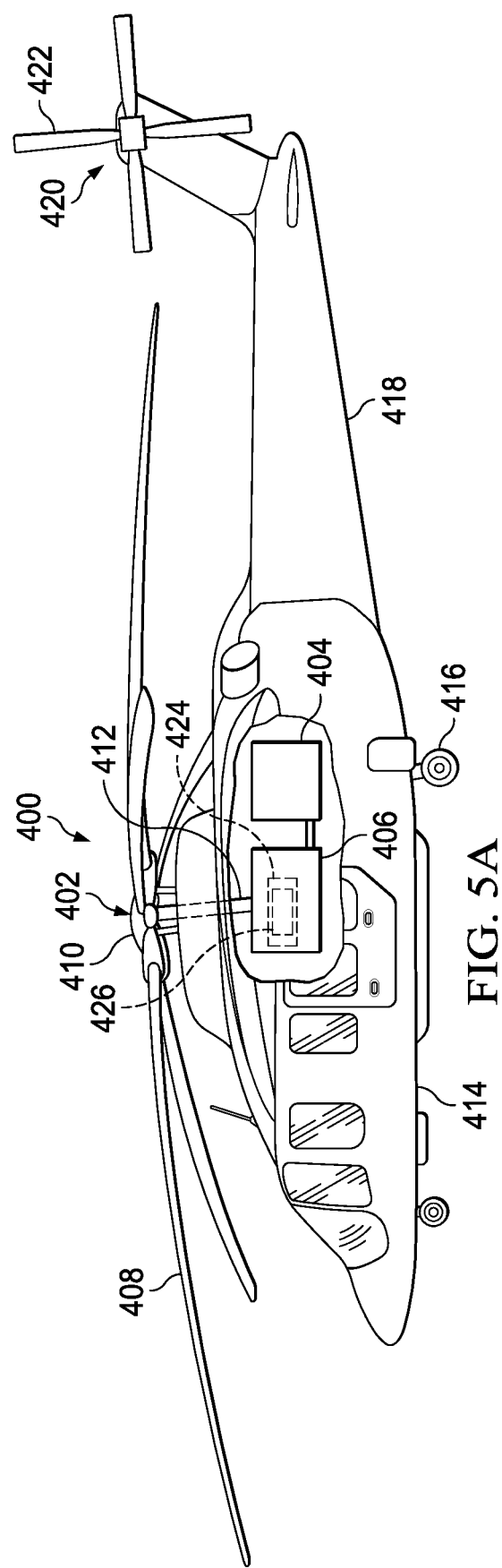
FIGS. 5A-5B are schematic illustrations of a helicopter utilizing an integral carrier with flexured carrier posts and flexured roller races in accordance with embodiments of the present disclosure.
Figure 5B:
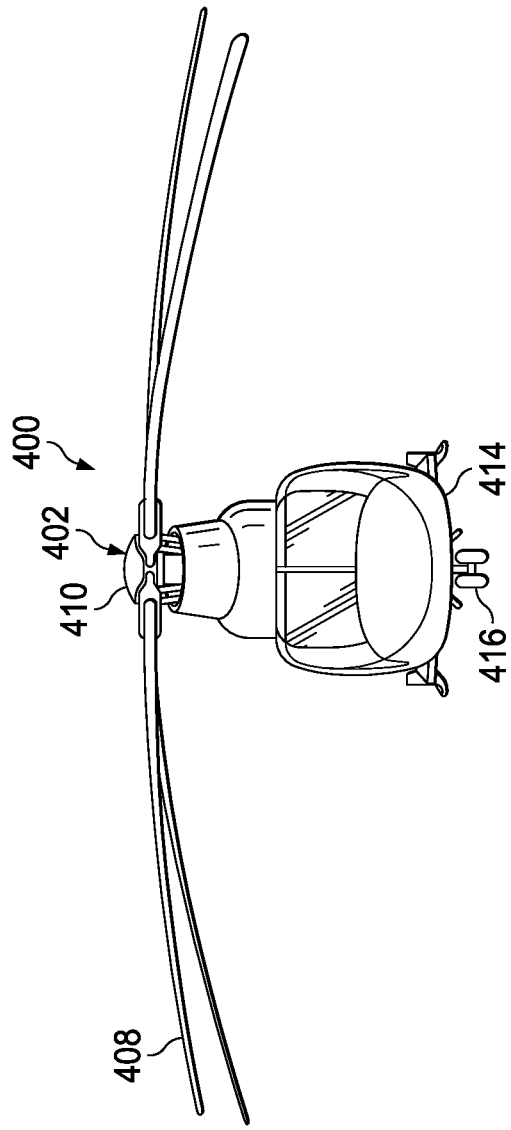

Referring to FIGS. 5A-5B in the drawings, a helicopter is schematically illustrated and generally designated 400. The primary propulsion assembly of helicopter 400 is a main rotor assembly 402 powered by an engine 404 via a main rotor gearbox 406. Main rotor assembly 402 includes a plurality of rotor blade assemblies 408 extending radially outward from a main rotor hub 410. Mast 412 provides rotational energy from main rotor gearbox 406 to main rotor hub 410. Main rotor assembly 402 is coupled to fuselage 414. Main rotor hub 410 is rotatable relative to fuselage 414. The pitch of rotor blade assemblies 408 can be collectively and/or cyclically manipulated to selectively control direction, thrust and lift of helicopter 400. A landing gear system 416 provides ground support for helicopter 400. A tailboom 418 extends from fuselage 414 in the aft direction. An anti-torque system 420 includes a tail rotor 422 that is rotatably coupled to the aft portion of tailboom 418. Anti-torque system 420 controls the yaw of helicopter 400. Main rotor gearbox 406 includes planetary gear system 424, which utilizes integral carrier 426 with flexured carrier posts and flexured roller races. Integral carrier 426 may have any configuration such as those described in the illustrative embodiments. The inclusion of integral carrier 426 on helicopter 400 is demonstrative of the numerous aircraft types and applications on which the integral carriers of the illustrative embodiments may be implemented.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A planetary gear system comprising:
   a sun gear;
   a plurality of planet gears rotatable about the sun gear;
   a ring gear surrounding the planet gears such that the planet gears mate with the sun gear and the ring gear;
   an integral carrier forming a plurality of flexured carrier posts each supporting a respective one of the planet gears, each flexured carrier post having a fixed proximal end and a cantilevered distal end; and
   a plurality of flexured roller races each having a fixed end and a cantilevered end, the fixed end of each flexured roller race coupled to the cantilevered distal end of a respective flexured carrier post, the planet gears configured to engage with the flexured roller races to rotate about the flexured carrier posts;

wherein, the cantilevered ends of the flexured roller races experience cantilevered motion to absorb loads from the planet gears.

2. The planetary gear system as recited in claim 1 further comprising a plurality of rollers disposed between respective planet gears and flexured roller races, the rollers configured to roll against the flexured roller races to enable rotation of the planet gears about the flexured carrier posts.

3. The planetary gear system as recited in claim 2 wherein the rollers each have a rotational axis, the rotational axes of the rollers substantially parallel.

4. The planetary gear system as recited in claim 1 wherein the integral carrier is monolithically formed from a substantially homogenous material.

5. The planetary gear system as recited in claim 1 wherein the integral carrier forms a ring and wherein the flexured carrier posts jointlessly project from the ring.

6. The planetary gear system as recited in claim 1 wherein the cantilevered distal ends of the flexured carrier posts experience cantilevered motion to absorb loads from the planet gears.

7. The planetary gear system as recited in claim 6 wherein the cantilevered distal ends of the flexured carrier posts and the cantilevered ends of the flexured roller races are configured to simultaneously experience cantilevered motion to maintain alignment of the planet gears.

8. The planetary gear system as recited in claim 1 wherein each flexured carrier post forms a retention ridge, the fixed end of each flexured roller race configured to abut against the retention ridge of a respective flexured carrier post.

9. The planetary gear system as recited in claim 1 wherein the cantilevered ends of the flexured roller races each form a roller retaining ridge projecting radially outward and configured to retain a plurality of rollers.

10. The planetary gear system as recited in claim 1 wherein an annular gap is formed between each flexured roller race and a respective flexured carrier post to permit the cantilevered motion of the flexured roller races.

11. The planetary gear system as recited in claim 1 wherein each flexured roller race has a generally hollow cylindrical shape.

12. The planetary gear system as recited in claim 1 wherein the planetary gear system further comprises a plurality of race retainers coupled to the cantilevered distal ends of the flexured carrier posts to retain the flexured roller races on the flexured carrier posts.

13. The planetary gear system as recited in claim 12 wherein the race retainers each form a roller retaining ridge projecting radially outward and configured to retain a plurality of rollers.

14. The planetary gear system as recited in claim 12 wherein the flexured carrier posts each form a retention ridge, the fixed ends of the flexured roller races sandwiched between the retention ridges and the race retainers.

15. A carrier for a planetary gear system having a sun gear, a plurality of planet gears rotatable about the sun gear and a ring gear surrounding the planet gears such that the planet gears mate with the sun gear and the ring gear, the carrier comprising:

a ring;

a plurality of flexured carrier posts projecting from the ring, each flexured carrier post having a fixed proximal end and a cantilevered distal end; and a plurality of flexured roller races each having a fixed end and a cantilevered end, the fixed end of each flexured roller race coupled to the cantilevered distal end of a respective flexured carrier post, each flexured roller race configured to engage with a respective one of the planet gears such that each planet gear rotates about a respective one of the flexured carrier posts;

wherein, the cantilevered ends of the flexured roller races experience cantilevered motion to absorb loads from the planet gears.

16. The carrier as recited in claim 15 wherein the ring and the plurality of flexured carrier posts are monolithically formed together from a substantially homogenous material.

17. The carrier as recited in claim 15 wherein the flexured carrier posts jointlessly project from the ring.

18. The carrier as recited in claim 15 wherein the cantilevered distal ends of the flexured carrier posts experience cantilevered motion to absorb loads from the planet gears.

19. The carrier as recited in claim 18 wherein the cantilevered distal ends of the flexured carrier posts and the cantilevered ends of the flexured roller races are configured to simultaneously experience cantilevered motion to maintain alignment of the planet gears.

20. The carrier as recited in claim 15 wherein an annular gap is formed between each flexured roller race and a respective flexured carrier post to permit the cantilevered motion of the flexured roller races.

* * * * *